Patented Mar. 27, 1945

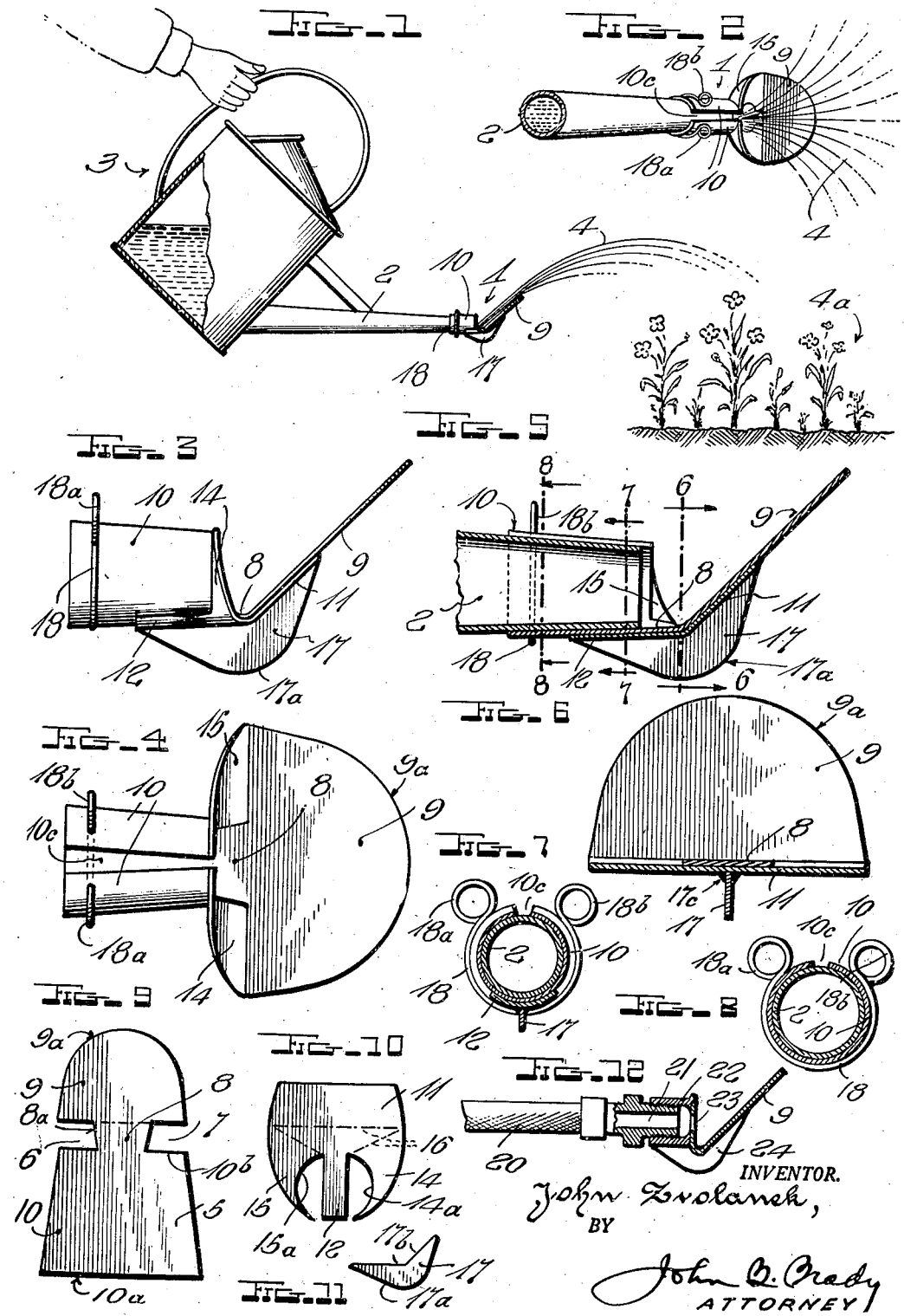

2,372,466

UNITED STATES PATENT OFFICE 2,372,466

NOZZLE FOR WATERING CANS

John Zvolanek, Fort Myers, Fla.

Application May 18, 1944, Serial No. 536,150

3 Claims. (Cl. 299—121)

My invention relates broadly to spray nozzles and more particularly to an improved construction of spray nozzle capable of effecting wide distribution of fluid over a relatively large area.

One of the objects of my invention is to provide a construction of fluid spray nozzle which may be formed from a minimum number of parts for attachment to a fluid pressure source for distributing fluid in a relatively fine spray over a relatively large area.

Another object of my invention is to provide an improved construction of nozzle for attachment to watering cans for effecting distribution of fluid in a relatively fine spray over a relatively large garden area.

Another object of my invention is to provide a construction of fluid spray nozzle in which the parts may be stamped from a minimum number of sheet metal parts and assembled and interconnected for providing an attachment for watering cans which will assure distribution of water over a relatively large garden area.

Still another object of my invention is to provide a construction of nozzle for fluid distributiontion which may be readily molded for attachment to a hose or spout of a watering can in a shape for distributing fluid in a relatively fine spray over a relatively large area.

Other and further objects of my invention reside in the construction of a fluid spray nozzle as set forth more fully in the specification hereinafter following by reference to the accompanying drawing in which: Figure 1 is a schematic view showing a watering can in use and equipped with the nozzle of my invention for spraying plants over a relatively wide area; Fig. 2 is a plan view of the nozzle of my invention applied to a spout which has been illustrated in section; Fig. 3 is a side elevational view of the nozzle of my invention; Fig. 4 is a plan view of the nozzle shown in Fig. 3; Fig. 5 is a longitudinal sectional view taken through the nozzle of my invention; Fig. 6 is a transverse sectional view taken on line 6—6 of Fig. 5 looking in the direction of the arrows; Fig. 7 is a transverse sectional view taken on line 7—7 of Fig. 5 looking in the direction of the arrows; Fig. 8 is a transverse sectional view taken on line 8—8 of Fig. 5 looking in the direction of the arrows; Figs. 9, 10 and 11 illustrate in plan view the shape of the sheet-like components from which the nozzle of my invention is assembled, and Fig. 12 shows the application of the nozzle of my invention to a hose as distinguished from the spout of a watering can.

The nozzle of my invention has been developed for the purpose of insuring distribution of water in a wide needle-like sheet over a large area of vegetation. The construction of the nozzle is very simple and lends itself to quantity production. In watering plants it is possible to direct the film of water from the nozzle of my invention so that the plants are supplied with moisture at the exact position desired, that is for example, directly at the bottom of the stalks of the plants so that no waste of the water takes place. It is thus possible to keep the water from wetting the tops of the plants so that the plants are protected from damage due to scalding by sun rays that otherwise might take place during the heat of the day. Moreover the structure of the nozzle which permits the accurate directing of the film of water protects certain varieties of plants from having certain pollens washed away. The structure of the nozzle is such that no inconvenience is encountered in stoppages by silt, sand, mud or other grains or dirt carried in the water, as everything that will pass through the spout of the watering can will also pour easily through and over the nozzle. The structure of my improved nozzle is such that it can be readily attached to the spout of a watering can or secured to the end of a hose, adjusted and removed at will. Furthermore, where some plants require special or slow watering, then the nozzle of my invention can be readily shifted either to the right side or the left side of the spout and the spray of water thus directed at will in the desired angular direction.

Referring to the drawing in more detail reference character 1 designates generally the nozzle of my invention applied to the spout 2 of a watering can 3 which is illustrated in use for distributing a spray of water in a relatively fine or needle-like film represented at 4 over a wide area of vegetation represented generally at 4a. The nozzle 1 is formed from three sheet metal parts shaped as shown in Figs. 9, 10 and 11. The sheet metal part 5 is stamped in quantities according to the shape shown in Fig. 9 with a pair of diametrically opposed recesses 6 and 7 formed therein on opposite sides of a longitudinally extending tongue 8 which interconnects the flat platform portion 9 with the spout engaging portion 10. It will be noted that the spout engaging portion 10 is tapered from a relatively wide section at 10a to a narrow section at 10b and that the tongue 8 has the edges 8a thereof tapered in the opposite directions. The flat platform portion 9 is curved around the terminus thereof as represented at 9a for effecting substantially equal distribution of the water sprayed over a large area.

The second sheet metal part from which the nozzle is formed is illustrated in Fig. 10 consisting of a reinforcing plate 11 having a centrally disposed integral tongue 12 connected therewith and a pair of tapering tongues 14 and 15 disposed on opposite sides thereof with their inner edges cut along a substantially semi-circular pattern represented at 14a and 15a. The member 11 is adapted to be bent or folded along dotted lines represented at 16 during assembly of the nozzle.

The third component of the nozzle is illustrated in Fig. 11 comprising a flat rib-like sheet member 17 having one edge formed on a curve 17a and the opposite edge formed on an obtuse angle represented at 17b. The reinforcing rib 17 is applied to the rear of plate member 11 when plate member 11 has been bent to the final assembly shape.

The nozzle of my invention is assembled by bending the flat platform portion 9 to an angular position at substantially an obtuse angle with respect to longitudinally extending tongue 8. The spout engaging portion 10 is then rolled to shape so that the sides thereof form a substantially tapered tubular housing into which the end of spout 2 may be inserted. The adjacent edges of the neck or tubular portion 10 do not meet each other but terminate in tapered alignment edge to edge on opposite sides of the gap 10c. The tapered walls of the tubular neck 10 are sufficiently resilient to enable the spout 2 of the watering can to be inserted therein for attaching the nozzle to the watering can. A spring member 18 of wire-like contour embraces the cylindrical side walls of the tubular housing 10 and terminates in finger engaging eyelets 18a and 18b which may be grasped by the fingers when applying or removing the nozzle with respect to spout 2 of the watering can 3. The eyelets 18a and 18b may be forced apart by the fingers for yieldably prying or separating the side walls of the tubular member 10 for easing the entry of the end of the spout 2 therein.

The plate 11 is bent to shape as illustrated more clearly in Figs. 3 and 5 co-planar with the flat platform portion 9 of the nozzle and secured thereto by soldering, spot welding or in some other appropriate manner. The tongue 12 is bent to shape to correspond with the under surface of the tubular portion 10 and is secured thereto by soldering, spot welding or in some other suitable manner. The two tongues 14 and 15 of member 11 are bent around the opposite sides of tubular member 10 and are welded, soldered or secured in some other suitable manner at the edges thereof. Thus a fluid guide surface is provided adjacent the end of tubular member 10 and flat platform 9 so that water delivered from the end of spout 2 is directed over flat platform 9 and is prevented from falling rearwardly by the extension of members 14 and 15 on opposite sides of tubular portion 10.

The reinforcing rib 17 having the obtuse angle cut out at 17b is then applied to the rear of tongue 12 and angularly disposed plate 11. The rib-like member 17 is soldered, spot welded or therwise secured to the rear of tongue 12 and plate 11 as represented at 17c in Fig. 6. Thus the rib 17 functions to maintain parts 11 and 10 in assembled relation with the flat platform 9 disposed at a predetermined angle for insuring distribution of fluid over a relatively wide area as the fluid is delivered through the spout 2 of watering can 3.

The nozzle of my invention may also be applied to the end of a hose as represented in Fig. 12. In this arrangement the hose is shown provided with a screw threaded terminus 21. The flat platform 9 of the nozzle is illustrated as extending from the cylindrical screw threaded member 22 which is engaged over the screw threads 21 of the fitting on the end of the hose 20. An orifice 23 in the extension on plate 9 enables water delivered through hose 20 to be delivered against flat platform 9 and thus directed in a thin film or spray over a relatively large area. Reinforcing rib-like member 24 extends externally of cylindrical member 22 and the rear of flat platform 9 serving as an interconnecting reinforcing means between cylindrical member 22 and flat portion 9. The angular position of flat platform 9 with respect to orifice 23 may be selected to secure the desired fluid distribution through the hose system.

I have heretofore explained my invention as specifically applicable to watering cans and to hose for the spraying of vegetation, gardens, lawn, etc., but I desire that it be understood that the device of my invention is equally applicable in the rapid spraying of paint and surface finishes over manufactured articles. Accordingly, I desire that it be understood that my invention is not to be specifically limited to the use or the construction herein illustrated, but that I intend my invention to be applicable to various uses and the structure thereof to be capable of modification and change within the scope of the appended claims without departing from the spirit of my invention.

What I claim and desire to secure by Letters Patent of the United States is as follows:

1. A spraying nozzle comprising a first sheet-like member tapered from a relatively wide dimension at one limiting edge to a curved peripheral edge at the opposite end thereof with recesses formed intermediate the ends of said member for dividing said member into a spray distributing portion and a spout engaging portion, the sides of the spout engaging portion of said member being rolled toward each other for engaging a fluid delivery spout and the spray distributing portion being disposed at an angle with respect to the central axis of the rolled sides of the spout engaging portion, a second member having one portion thereof co-planar with the spray distributing portion of said first mentioned member and having a pair of tapering portions engageable with opposite sides of the spout engaging portions of said first mentioned member, and a third member comprising a rib-like plate engaging the under surface of that portion of said second mentioned member which is co-planar with said first mentioned member, said third member having another portion thereof secured in reinforcing relation to the spout engaging portion of said first mentioned member.

2. A spraying nozzle comprising a first sheet-like member tapered from a relatively wide dimension at one limiting edge to a curved peripheral edge at the opposite end thereof with recesses formed intermediate the ends of said membr for dividing said member into a spray distributing portion and a spout engaging portion, the sides of the spout engaging portion of said member being rolled toward each other for engaging a fluid delivery spout and the spray distributing portion being disposed at an angle with respect to the central axis of the rolled sides of the spout engaging portion, a second member having one portion thereof co-planar with the spray distributing portion of said first mentioned member and having a pair of tapering portions engageable with opposite sides of the spout engaging portions of said first mentioned member and having a tongue-like member engageable with the exterior wall of the spout engaging portion of said first mentioned member, and a third member comprising a rib-like plate engaging under surface of that portion of said second mentioned member which is co-planar with said first mentioned member, said third member having another portion thereof secured in reinforcing relation to the tongue of said second mentioned member.

3. A spraying nozzle comprising a first sheet-like member tapered from a relatively wide dimension at one limiting edge to a curved peripheral edge at the opposite end thereof with recesses formed intermediate the ends of said member for dividing said member into a spray distributing portion and a spout engaging portion, the sides of the spout engaging portion of said member being rolled toward each other for engaging a fluid delivery spout and the spray distributing portion being disposed at an angle with respect to the central axis of the rolled sides of the spout engaging portion, a second member having one portion thereof co-planar with the spray distributing portion of said first mentioned member and having a pair of tapering portions engageable with opposite sides of the spout engaging portions of said first mentioned member and having a tongue-like member engageable with the exterior wall of the spout engaging portion of said first mentioned member, a third member comprising a rib-like plate engaging under surface of that portion of said second mentioned member which is co-planar with said first mentioned member, said third member having another portion thereof secured in reinforcing relation to the tongue of said second mentioned member, and a wire-like member extending around the sides of said spout engaging portions and terminating in finger grip members for facilitating insertion or removal of said spout engaging portions from the fluid delivery spout.

JOHN ZVOLANEK.